US011423293B2

(12) United States Patent
Lee et al.

(10) Patent No.: US 11,423,293 B2
(45) Date of Patent: Aug. 23, 2022

(54) NEUROMORPHIC SYSTEM

(71) Applicant: Seoul National University R&DB FOUNDATION, Seoul (KR)

(72) Inventors: Jong-Ho Lee, Seoul (KR); Sung Yun Woo, Seoul (KR); Won-Mook Kang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 874 days.

(21) Appl. No.: 16/205,478

(22) Filed: Nov. 30, 2018

(65) Prior Publication Data

US 2019/0171933 A1    Jun. 6, 2019

Related U.S. Application Data

(60) Provisional application No. 62/593,550, filed on Dec. 1, 2017.

(51) Int. Cl.
*G06N 3/063* (2006.01)
*G06N 3/04* (2006.01)

(52) U.S. Cl.
CPC ............. *G06N 3/0635* (2013.01); *G06N 3/04* (2013.01)

(58) Field of Classification Search
None
See application file for complete search history.

(56) References Cited

U.S. PATENT DOCUMENTS 5,083,285 A  *  1/1992  Shima ................... G06N 3/063
                                                        706/33
5,336,937 A  *  8/1994  Sridhar ............... G06N 3/0635
                                                        706/33
(Continued)

FOREIGN PATENT DOCUMENTS

KR      20100129741      12/2010
WO      2009113993       9/2009
WO      WO-2014018078 A1 *  1/2014  ............... G06N 3/02

OTHER PUBLICATIONS

Arthur, et al., Silicon-Neuron Design: A Dynamical Systems Approach, IEEE Transactions on Circuits and Systems-I: Regular Papers, May 2011, pp. 1034-1043.
(Continued)

*Primary Examiner* — Alexey Shmatov
*Assistant Examiner* — Beatriz Ramirez Bravo
(74) *Attorney, Agent, or Firm* — Cantor Colburn LLP

(57) ABSTRACT

Provided is a neuromorphic system using a neuron circuit. The neuromorphic system includes: one or two or more neuron circuits configured to output a firing signal according to signals input from a synapse array; a homeostatic circuit for each neuron circuit; and a global self-controller configured to generate and provide control signals for the neuron circuits by using the firing signal output from the neuron circuits. The neuron circuit includes a neuromorphic device and an output circuit that outputs the firing signal of the neuromorphic device. The global self-controller generates and supplies a reset signal to the neuromorphic device of the fired neuron circuit, and the global self-controller generates and supplies a lateral inhibition signal to the neuromorphic device of the non-fired neuron circuit. The homeostatic circuit alleviates inhibition of other neurons by the neurons with a predominant firing function.

13 Claims, 18 Drawing Sheets

(56) References Cited

U.S. PATENT DOCUMENTS

| | | | |
|---|---|---|---|
| 9,275,329 B2* | 3/2016 | Hunzinger | G06N 3/049 |
| 9,431,099 B2* | 8/2016 | Lee | H01L 27/11568 |
| 9,583,701 B1* | 2/2017 | Gee | H01L 29/8615 |
| 2015/0254552 A1* | 9/2015 | Park | G06N 3/0635 |
| | | | 706/33 |
| 2017/0243109 A1* | 8/2017 | Hu | G06N 3/0635 |
| 2019/0102669 A1* | 4/2019 | Chen | G06N 3/049 |
| 2019/0138881 A1* | 5/2019 | Lin | G06N 3/04 |

OTHER PUBLICATIONS

Indiveri, et al., Neuromorphic silicon neuron circuits, Frontiers in Neuroscience, May 2011, pp. 1-23.

Poon, et al., Neuromorphic silicon neurons and large-scale neural networks: challenges and opportunities, Frontiers in Neuroscience, Sep. 2011, pp. 1-3.

* cited by examiner

NEUROMORPHIC SYSTEM

BACKGROUND OF THE INVENTION

1. Field of the Invention

The present invention relates to a neuromorphic system configured to be capable of implementing homeostasis, reset, and lateral inhibiting functions of a neuron by using neuron circuits including neuromorphic devices capable of imitating neurons at a low power and a high degree of integration in neuromorphic techniques.

2. Description of the Related Art

In recent years, many approaches have been made to imitate nervous systems of animals as power consumption has increased significantly and heat release problems have become more serious in integrated circuits based on the von Neumann architecture. Particularly, in the techniques imitating the nervous systems of animals, it is possible to improve the cognitive function and the determining function by enabling cognitive function and learning while greatly reducing power consumption.

As a result, there is an opportunity to replace or greatly improve the functionality of the existing von Neumann integrated circuits. Therefore, much attention has been increasingly paid to the technique, and the need for research has been greatly increased.

The basic function of neurons is to generate electrical spikes and transmit information to other cells in a case where a stimulus exceeds a threshold value. The resulting electrical signal is called an action potential. Neurons may be roughly divided into three portions. The neuron includes a nerve cell body where a nucleus exists, a dendrite which receives a signal from another cell, and an axon which transmits a signal to another cell. A portion which transmits a signal between the dendrites is called a synapse.

The neuron receives a stimulus from another nerve cell or a stimulus receptor cell and transmits the stimulus to another nerve cell or a glandular cell. Exchanging the stimulus occurs at the synapse. One nerve cell (neuron) receives stimuli through a number of synapses and integrates the excitations, and after that, the nerve cell transmits an electrical spike to an axon near to the nerve cell body, so that the electrical spike reaches the synapse.

In this manner, the transmission of the excitations from the neuron through the synapses to another nerve cell is referred to as excitation transmission. The excitation at the synapse is transmitted only from a nerve fiber toward a nerve cell body or a dendrite and is not transmitted in the reverse direction, so that the excitation is transmitted in only one direction as a whole.

In addition, the synapses are not only relay sites that transmit the excitations but the synapses also cause weighting or inhibition according to temporal or spatial change in excitations reaching the synapses to enable higher level integration of the nervous system.

On the other hand, besides the synapses having the action of transmitting the excitation, there are synapses having the action of inhibiting the transmission of the excitations from other nerve cells. These synapses are called inhibitory synapses. When the excitation transmitted along some nerve fibers reaches the inhibitory synapse, the inhibitory transmitting material is secreted from the synapse. This inhibitory transmitting material acts on a cell membrane of the nerve cell connected to the synapse to inhibit the excitations of the cell from occurring (occurrence of an action potential). As a result, while the inhibitory transmitting material acts, the excitation reaching other synapses is not transmitted to the synapse.

In this manner, the neuron performs an excitation transmitting function of transmitting the excitation from one or two or more neurons to the next neuron through the synapses. The neuron performs an excitation integrating/transmitting function of integrating the excitations transmitted from a plurality of neurons and transmitting the integrated excitation to the next neuron. The neuron performs an excitation inhibiting function of inhibiting inhibits the transmission of the excitation from other neurons.

A CMOS-based neuron circuit in the related art is configured to include a capacitor responsible for an integrating function, a comparator for firing when a signal equal to or higher than a specific threshold value is applied, and additional circuits for securing delay and stability. Accordingly, the CMOS-based neuron circuits in the related art have problems in that, due to a large size of the integrate capacitor, the entire area is greatly increased, and due to an increases in the number of devices, the area is increased, and the power consumption is also increased. These structural limitations lead to various disadvantages in that the configuration of the neuromorphic system is complicated, and there is a limitation in terms of accuracy Accordingly, the invention proposes a neuromorphic system based on the neuron circuit which is capable of devising a neuron circuit by using a neuromorphic device and implementing the homeostasis, reset, and lateral inhibiting functions of the neuron.

SUMMARY OF THE INVENTION

The invention is to provide a neuromorphic system configured to be capable of implementing homeostasis, reset, and lateral inhibiting functions of a neuron while solving the problems of a large area and high power consumption of an existing neuron circuit.

According to an aspect of the invention, there is provided a neuromorphic system including: one or two or more neuron circuits configured to output a firing signal according to signals input from a synapse array; and a global self-controller configured to generate and provide control signals for the neuron circuits by using the firing signal output from the neuron circuits, wherein the neuron circuit includes: a neuromorphic device configured to accumulate charges according to the signal input from the synapse array and to allow a current to suddenly flow when a potential due to the accumulated charges reaches a threshold value; an output circuit connected to one end of the neuromorphic device and outputting the firing signal according to an output signal of the neuromorphic device; and a first switching device configured to be located between one end of the neuromorphic device and the output circuit and to control an electrical connection between the neuromorphic device and the output circuit.

In the neuromorphic system according to the above-described aspect, it is preferable that the neuromorphic device includes: a first semiconductor region provided on a substrate, the first semiconductor region having a horizontally or vertically thin structure; first, second, third, and fourth doped regions provided in the first semiconductor region; a first insulating film configured so that at least the second and third doped regions among the doped regions are separated from the substrate by a predetermined distance; a first gate electrode located on one side of the second or third doped region, the first gate electrode being electrically insulated from the second and third doped regions; and a first gate insulating film stack provided at least between one side of the second or third doped region and the first gate electrode, and the neuron circuit outputs the firing signal to the global self-controller according to the signal input from the synapse array to the first gate electrode of the neuromorphic device.

In the neuromorphic system according to the above-described aspect, it is preferable that the first gate electrode of the neuromorphic device is connected to the synapse array through a current mirror circuit, and wherein the neuromorphic device implements an integrating function of the neuron by storing or removing charges in or from the first gate insulating film stack according to the signal applied from the synapse array.

In the neuromorphic system according to the above-described aspect, it is preferable that, when the firing signal is input from one neuron circuit, the global self-controller generates and supplies a reset signal for the neuromorphic device of the fired neuron circuit, and the global self-controller generates and supplies a lateral inhibition signal for the neuromorphic device of the non-fired neuron circuit.

In the neuromorphic system according to the above-described aspect, it is preferable that, when the firing signal is input from one neuron circuit, the global self-controller generates a turn-off signal for the first switching devices included in the neuron circuits and supplies the turn-off signal to the neuron circuits so that the first switching devices are turned off and no current flows in the neuromorphic device.

In the neuromorphic system according to the above-described aspect, it is preferable that the neuron circuit further includes: a second switching device configured to be connected in parallel to the neuromorphic device and to be driven by an output signal of the output circuit; and a feedback circuit connected to the output circuit, and the second switching device is configured to be turned on by the firing signal output from the output circuit and to improve the firing function of the neuron circuit.

In the neuromorphic system according to the above-described aspect, it is preferable that the neuromorphic system further includes one or two or more homeostatic circuits provided corresponding to the respective neuron circuits, wherein an input terminal of the homeostatic circuit is connected to an output terminal of the output circuit of the neuron circuit, and an output terminal of the homeostatic circuit is connected to a second gate electrode of the neuromorphic device, and wherein the homeostatic circuit controls a voltage applied to the second gate electrode of the neuromorphic device according to a signal of the output terminal of the output circuit to adjust a firing threshold voltage of the neuromorphic device and adjust a firing rate of the neuron circuit so as to be capable of implementing a homeostasis function of neurons.

In the neuromorphic system according to the above-described aspect, it is preferable that the homeostatic circuit includes: an individual current mirror circuit connected to the output terminal of the neuron circuit; a common current mirror circuit commonly connected to all the neuron circuits connected to the global self-controller; and a charge storage device as a device capable of storing charges configured to accumulate the charges by currents flowing in the individual current mirror circuit and the common current mirror circuit and to be connected to the second gate electrode of the neuromorphic device of the neuron circuit.

In the neuromorphic system according to the above-described aspect, it is preferable that, when the neuron circuit is fired, the homeostatic circuit allows the firing signal to be transmitted to the individual current mirror and accumulates the charges in the charge storage device connected to the fired neuron circuit so as to increase a threshold voltage of the fired neuron circuit, and the homeostatic circuit allows the firing signal to be transmitted to the common current mirror and discharges the charges accumulated in the charge storage device connected to the non-fired neuron circuit so as to decrease the threshold voltage of the non-fired neuron circuit.

In the neuromorphic system according to the above-described aspect, it is preferable that the global self-controller includes: a global self-control module that generates a reset pulse when the firing signal is input from one of the one or two or more neuron circuits and outputs the reset pulse; and one or two or more individual control modules that generate signals for controlling the respective neuron circuits according to the reset pulse and the firing signal input from the neuron circuits and output the signals to corresponding neuron circuits, and the global self-controller generates control signals for the neuron circuits by using the firing signals input from the neuron circuits and supplies the control signals to the neuron circuits.

In the neuromorphic system according to the above-described aspect, it is preferable that the global self-control module includes: an extended pulse generator that extends a pulse width of the input firing signal and outputs the firing signal; a voltage level shifter that generates the reset pulse by increasing a size of the firing signal having the extended pulse width and outputs the reset pulse to the individual control modules; and an SW1 driving module that generates a turn-off signal for the first switching device by using the firing signal having the extended pulse width and 'outputs the turn-off signal to each neuron circuit.

In the neuromorphic system according to the above-described aspect, it is preferable that the global self-control module includes: a switch controller that generates a predetermined selection signal necessary for selecting the reset signal and outputs the selection signal when the firing signal is input from the neuron circuit; and an LI/Reset signal selection switch that selects one of the reset signal and a lateral inhibition signal according to signals input from the switch controller and the global self-control module and outputs the selected signal to the neuromorphic device of the neuron circuit.

In the neuromorphic system according to the above-described aspect, it is preferable that the LI/Reset signal selection switch selects and outputs the reset signal when the selection signal is input from the switch controller and the reset pulse is input from the global self-control module, and the LI/Reset signal selection switch selects and outputs the lateral inhibition signal when no selection signal is input from the switch controller.

In the neuromorphic system according to the above-described aspect, it is preferable that the output circuit is configured with one of: an inverter that inverts and outputs an input signal, and a current-voltage converter that converts an input current into a voltage and outputs the voltage.

The neuron circuit according to the invention is based on a charge storage layer having a memory function and a neuromorphic device having a positive feedback function, so that it is possible to implement highly integrated and low-power neuromorphic system.

In addition, the neuromorphic devices included in the neuron circuit can be implemented on a substrate such as general n-type and p-type MOSFETs used in the neuron circuit and the neuromorphic system.

In addition, the neuron circuit of the neuromorphic system according to the invention improves the firing of the neuromorphic device by connecting the switch and the output circuit to the neuromorphic device.

In addition, the neuromorphic system according to the invention further includes the homeostatic circuit, so that the voltage applied to the gate electrode can be adjusted according to the firing rate of the neuron circuit, so that it is possible to implement the homeostasis function of the neuron. In addition, the neuromorphic system according to the invention further includes a homeostatic circuit, so that it is possible to alleviate inhibition of other neurons by the neuron dominantly having the firing function.

In addition, the neuromorphic system according to the invention includes a global self-controller, and common circuits are shared so as to allow the neuron circuit to organically perform the reset and lateral inhibition operations through the global self-controller, so that it is possible to provide systematic operation and efficiency in terms of area.

In addition, the neuromorphic system according to the invention selectively performs one of reset and lateral inhibition operations for each neuron circuit according to whether or not each neuron circuit is fired. In addition, the neuromorphic system according to the invention can generate a signal necessary for the operation of each neuron circuit through the global self-controller without an additional external controller.

In addition, since the neuromorphic system according to the invention can utilize the global self-controller in a case where an extended pulse generator and a voltage level shifter are included in generating a signal necessary for the memory operation of the external synapse, the neuromorphic system has a good extendability.

DETAILED DESCRIPTION OF THE EMBODIMENTS

The invention provides a neuron circuit using a neuromorphic device capable of being effectively integrated with a synapse array and having a low power and a high degree of integration and a neuromorphic system using the neuron circuit. In particular, the neuromorphic device included in the neuron circuit according to the invention has an integrating function of a general neuron according to a program or erase operation in a charge storage layer. As a result, the neuron circuit according to the invention can implement a neuromorphic system having a high efficiency in terms of area. In addition, the neuromorphic device used in the neuron circuit according to the invention not only has an integrating function but is capable of implementing a firing function of transmitting a signal to the next synapse and neuron circuit instantaneously when the neuromorphic device reaches a threshold voltage in a small area through a positive feedback operation of electrons and holes in the neuromorphic device.

Conceptually, the neuron circuit according to the invention is configured by connecting an output circuit and a switch to the neuromorphic device, and n-type and p-type MOSFETs are used to configure the output circuit and the switch. These MOSFETs can be implemented in a bulk substrate or an SOI substrate, and the neuromorphic device can also be implemented in the same substrate.

In addition, the neuron circuit according to the invention is connected to a homeostatic circuit configured with n-type and p-type MOSFETs, and thus, a threshold voltage of the fired neurons is adjusted to be increased and a threshold voltage of neighboring neurons is adjusted to be decreased, so that a. homeostasis function can be implemented.

In addition, in implementing a neuron-based neuromorphic system according to the invention, a global self-controller exists in order to organically operate each neuron of a neuron monolayer. The neuromorphic system itself generates signals necessary for one or more neuron circuits. The neurons in the neuron monolayer share the global self-controller and can generate reset and lateral inhibition signals necessary for the operations of the neurons and can selectively allocate the signals to each neuron.

Hereinafter, a neuron circuit according to embodiments of the invention will be described in detail with reference to the accompanying drawings.

Figure 1A:
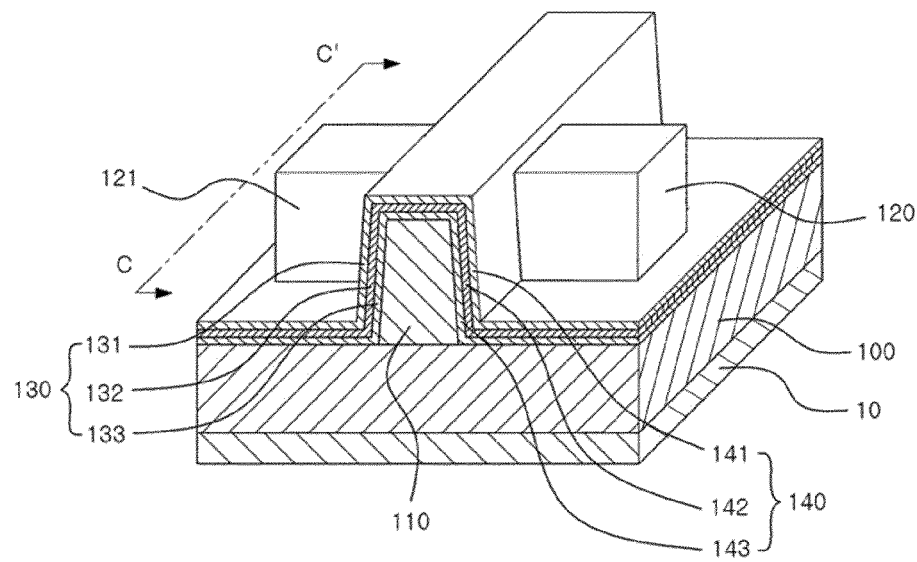
FIG. 1A is a perspective view illustrating an embodiment of a neuromorphic device used in a neuron circuit according to a first embodiment of the invention.
Figure 1B:
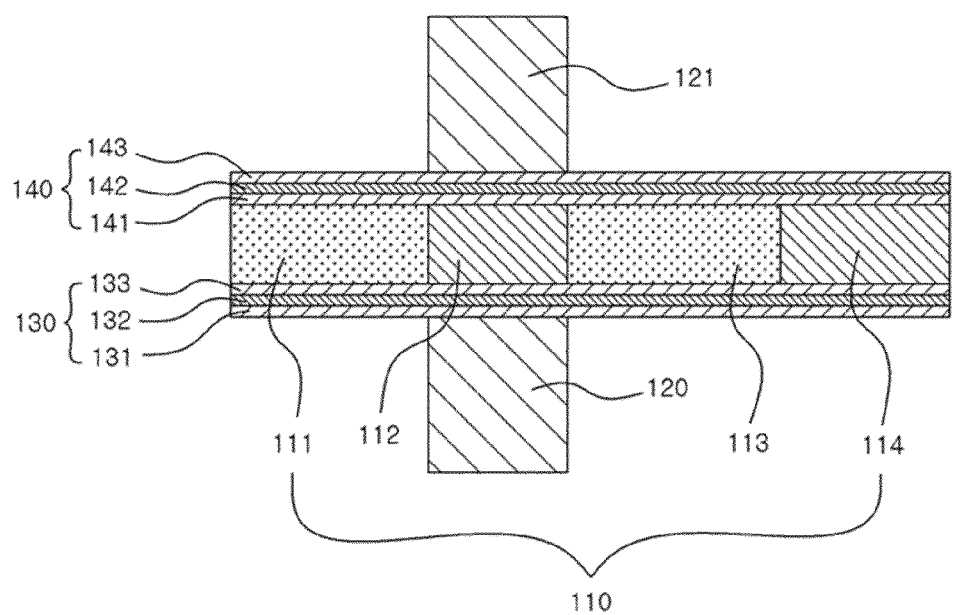
FIG. 1B is a cross-sectional view taken along a C-C' direction of the neuromorphic device in FIG. 1A.

FIGS. 1A and 1B are a perspective view and a cross-sectional view in a C-C' direction illustrating an embodiment of a neuromorphic device used in a neuron circuit according to the invention. Hereinafter, a structure of the neuromorphic device will be described in detail with reference to FIGS. 1A and 1B.

Referring to FIGS. 1A and 1B, the neuromorphic device includes an insulating film 100, a substrate 10, a first semiconductor region 110 that is made of a semiconductor material on the substrate and formed in a vertical or horizontal thin wall shape, first, second, third, and fourth doped regions 111, 112, 113, and 114 that are sequentially formed on the first semiconductor region, first and second gate electrodes (SG1 and SG2) 120 and 121 that are located on on two sides of the second doped region, a first gate insulating film stack 130 that is provided between the first gate electrode and the second doped region, and a second gate insulating film stack 140 that is provided between the second gate electrode and the second doped region. It is preferable that each of the first and second gate insulating film stacks has at least one charge storage layer so as to be capable of adjusting a threshold voltage or providing a memory function.

Figure 2A:
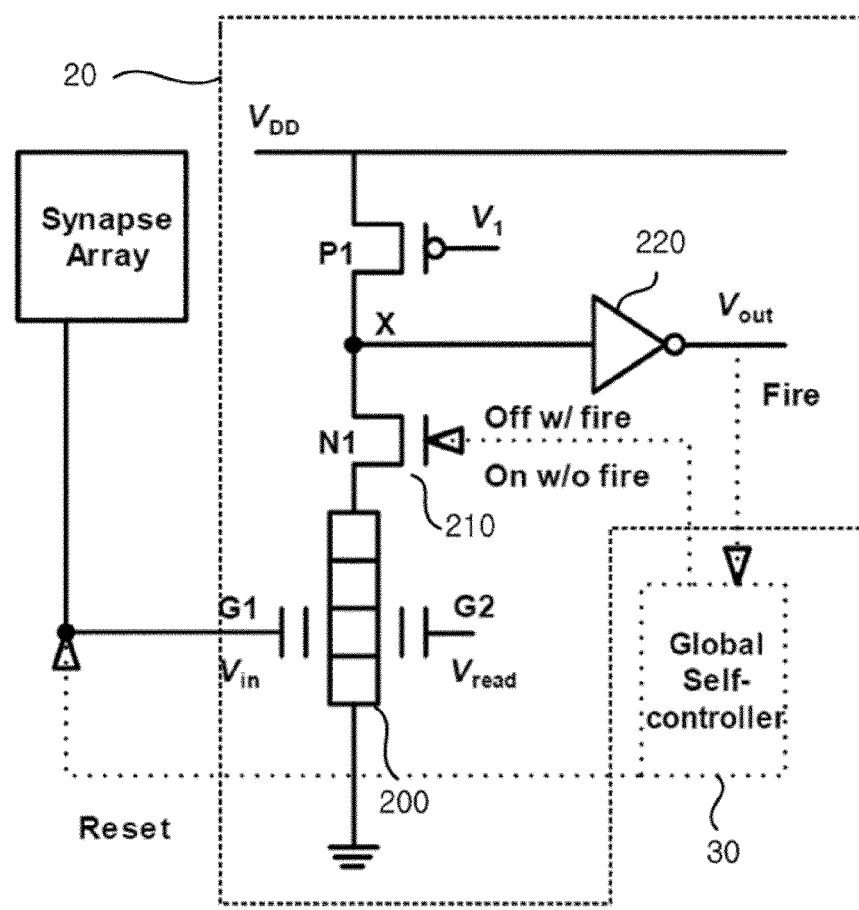
FIG. 2A is a circuit diagram illustrating the neuron circuit including the neuromorphic device in a neuromorphic system according to the first embodiment of the invention.
Figure 2B:
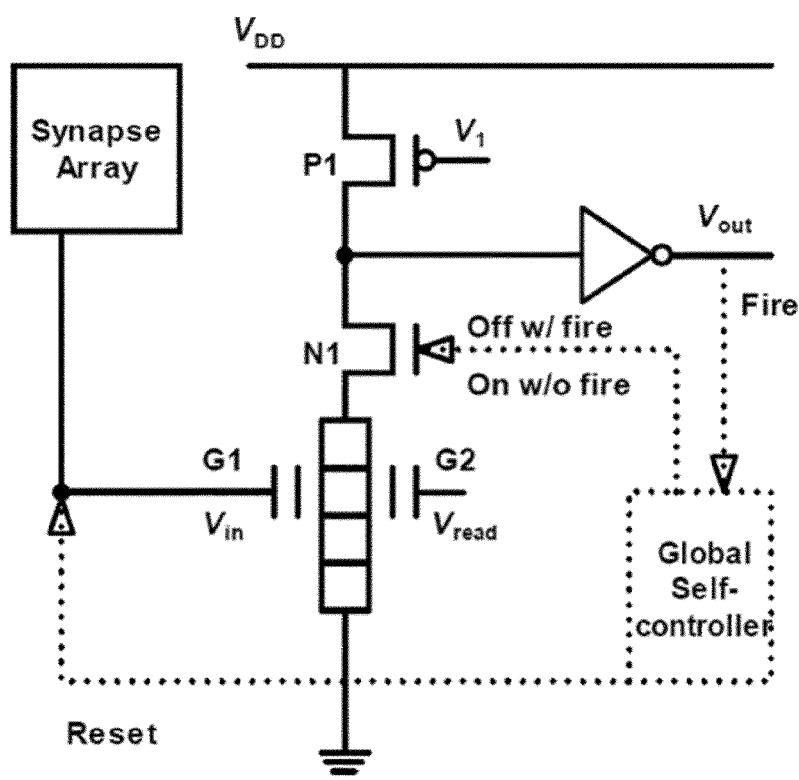
FIGS. 2B to 2D are circuit diagrams for the neuron circuit, illustrating various embodiments for the neuromorphic device.
Figure 2C:
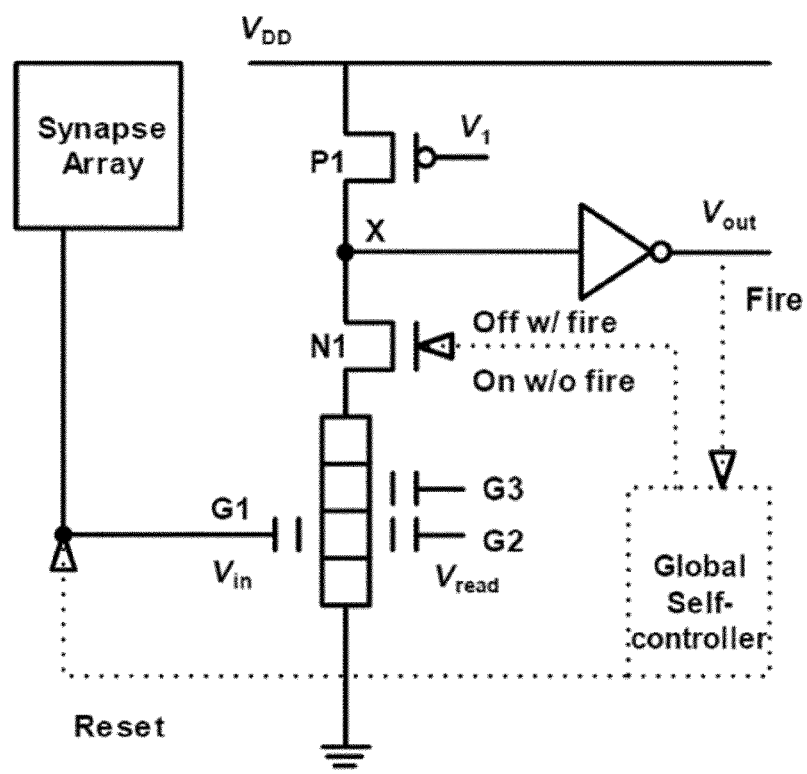
Figure 2D:
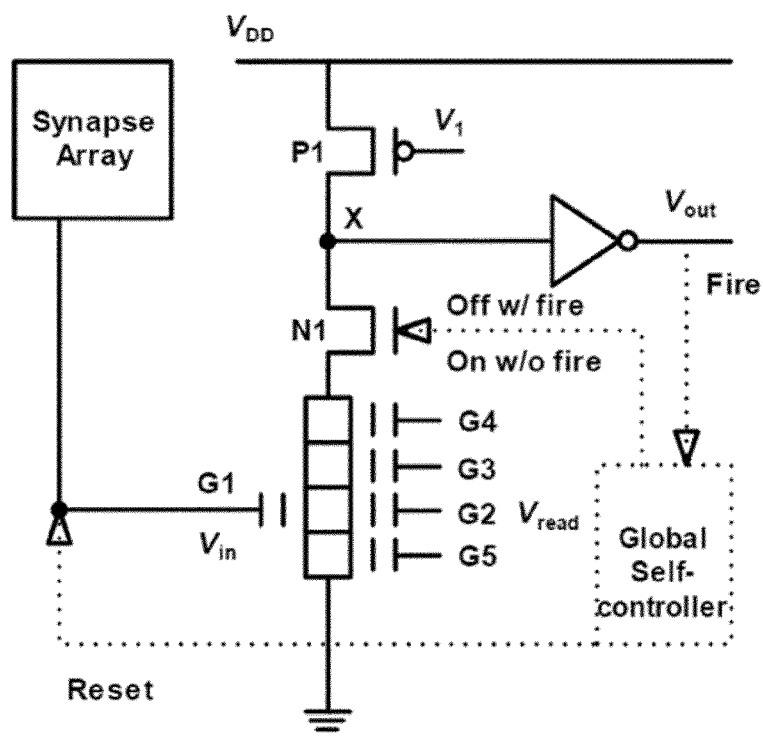

FIG. 2A is a circuit diagram illustrating a neuron circuit of a neuromorphic system according to the first embodiment of the invention, and FIGS. 2B to 2D are circuit diagrams illustrating modified structures of the circuit according to the first embodiment.

The neuron circuit of the neuromorphic system according to the invention is configured with a neuromorphic device, a general n-MOSFET, a general p-MOSFET. It is preferable that the n-MOSFET and the p-MOS FET are formed as the same time in the process of manufacturing the neuromorphic device.

Hereinafter, the structure of the neuron circuit of the neuromorphic system according to the first embodiment of the invention will be described in detail. The neuromorphic system according to the first embodiment of the invention includes a neuron circuit, a global self-controller, and a homeostatic circuit.

Referring to FIG. 2A, the neuron circuit 20 includes a neuromorphic device 200, a first switching device 210, and an output circuit 220. The first switching device 210 may be configured with an n-MOSFET N1. The neuron circuit 20 outputs a firing signal to the global self-controller 30 and receives control signals from the global self-controller. The control signal includes a reset signal or a lateral inhibition signal for the neuromorphic device and a drive signal for the first switching device.

The first gate electrode G1 of the neuromorphic device is connected to the output terminal of the synapse array so as to be applied with a signal from the synapse array. One end of the neuromorphic device is connected to the output circuit, and the first switching device is arranged between the one end of the neuromorphic device and the output circuit to control electrical connection between the neuromorphic device and the output circuit.

The output circuit 220 is a circuit functioning to transmit a current signal generated in the neuromorphic device to the global self-controller. The output circuit 220 may be configured with an inverter that inverts an output signal of the neuromorphic device and outputs the inverted output signal or may be configured with a current-voltage converter that converts the output current of the neuromorphic device into a voltage and outputs the voltage. The inverter may be configured with a transistor, a diode, or a resistor, and the current-voltage converter may also be configured with a transistor, a diode, or a resistor.

In this specification, for the convenience of description, the case where the output circuit is an inverter is exemplarily described. Therefore, an example of the output circuit according to the invention is an inverter, and in this case, the signal at a node X connected to the one end of the neuromorphic device is inverted, the inverted signal is supplied to the global self-controller.

The global self-controller 30 is input with the firing signal of the output circuit. According to the firing signal of the output circuit, the global self-controller 30 generates and supplies a reset signal for the neuromorphic device of the fired neuron circuit and generates and supplies a turn-off signal for the switching device.

The neuromorphic device is electrically connected to a drain of the n-MOSFET N1, and a source of the n-MOSFET and a drain of the p-MOSFET share the node X which is the input terminal of the output circuit 220. When signals are applied from the synapse array to the first gate electrode G1 of the neuromorphic device, charges are accumulated in the first gate insulating film stack of the neuromorphic device, and a current flows in the neuromorphic device. Accordingly, the potential of the node X as the input terminal is lowered, and the potential of the node OUT as the output terminal is increased, so that the signal is transmitted to the global self-controller. The global self-controller transmits an output signal for learning to the next synapse and other neighboring neurons and transmits the lateral inhibition signal that discharges the charges accumulated in the first gate insulating film of the fired neuromorphic device. At this time, the switch N1 connected to the fourth semiconductor region of the neuromorphic device is turned off to control the current not to flow during the reset operation of the neuromorphic device.

In addition, FIG. 2B is a circuit diagram including a modified neuromorphic device in the neuron circuit according to the first embodiment. The circuit of FIG. 2B is similar to the neuron circuit of the first embodiment, except for including a neuromorphic device in which the third gate electrode G3 is provided on the side of the second gate electrode G2. In the operation of the neuron circuit according to FIG. 2B, similarly to the neuron circuit of the first embodiment, the synapse signal is transmitted to the first gate electrode G1, and charges are accumulated in the first gate insulating film, so that a current flows in the neuromorphic device. Therefore, the threshold voltage of the neuromorphic device can be adjusted by using the voltage applied to the third gate electrode.

In addition, FIG. 2C is a circuit diagram including another embodiment of a modified neuromorphic device in the neuron circuit according to the first embodiment. The circuit of FIG. 2C is similar to the neuron circuit of the first embodiment, except for including a neuromorphic device in which the third gate electrode G3, the fourth gate electrode G4, and the fifth gate electrode G5 are provided on the side of the second gate electrode G2. In the operation of the neuron circuit according to FIG. 2C, similarly to the neuron circuit of the first embodiment, the synapse signal is transmitted to the first gate electrode, and charges are accumulated in the first gate insulating film, so that a current flows in the neuromorphic device. Therefore, the threshold voltage of the neuromorphic device can be adjusted by using the voltage applied to the third gate electrode G3, the fourth gate electrode G4, and the fifth gate electrode G5.

In addition, FIG. 2D is a circuit diagram including another embodiment of the modified neuromorphic device in the neuron circuit according to the first embodiment. The circuit of FIG. 2D is similar to the neuron circuit of the first embodiment, except for including a neuromorphic device in which the first gate electrode and the second gate electrode are provided on the side of the second semiconductor region S2. In the operation of the neuron circuit illustrated in FIG. 2D, a signal having the opposite polarity to that of the synapse signal applied to the first gate electrode in the neuron circuit of the first embodiment is transmitted, and the charges having the opposite polarity are accumulated in the first gate insulating film. When the voltage exceeds the threshold voltage, a current flows in the neuromorphic device. In addition, a signal having the opposite polarity of the lateral inhibition signal of the first embodiment is applied to the fired neuron circuit to discharge the accumulated charges.

Figure 3:
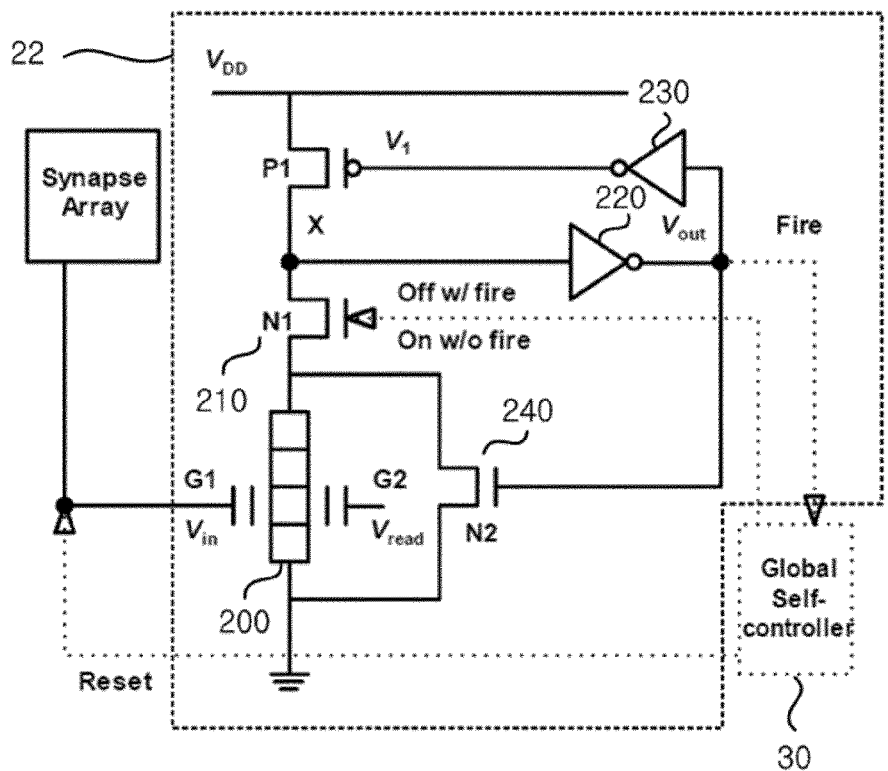
FIG. 3 is a circuit diagram illustrating a neuron circuit in a neuromorphic system according to a second embodiment of the invention.

FIG. 3 is a circuit diagram of a neuron circuit according to a second embodiment of the invention. Referring to FIG. 3, a neuron circuit 22 according to the second embodiment of the invention is similar to the neuron circuit according to the first embodiment except that a feedback circuit INV2 230 and a second switch N2 240 are added.

The feedback circuit 230 is connected between the output terminal of the output circuit 220 and the gate of the p-MOSFET P1 to supplies a signal of the output circuit to the gate terminal of the p-MOSFET. The feedback circuit 230 may be configured with an inverter that inverts an input signal and outputs the inverted input signal, and the inverter may be configured with a transistor, a diode, or a resistor.

The second switch N2 240 is configured with an n-MOSFET, the source and the drain are connected to both terminals of the neuromorphic device, and the gate terminal is connected to the output terminal of the output circuit.

Hereinafter, the operation of the neuron circuit according to the second embodiment will be described.

When the current flows in the neuromorphic device to lower the potential of the node X, the potential of the output terminal is increased by the output circuit INV1, so that a current also flows in the second switch N2 to form a boosting path. As a result, the potential of the node X is more speedily lowered, and the firing occurs at a faster rate. The signal is transmitted to the p-MOSFET by the feedback circuit 230, and thus, P1 is turned on and the first switch N1 is turned off, so that the potential of the node X is increased to the voltage VDD again and the neuromorphic device is rest.

Figure 4:
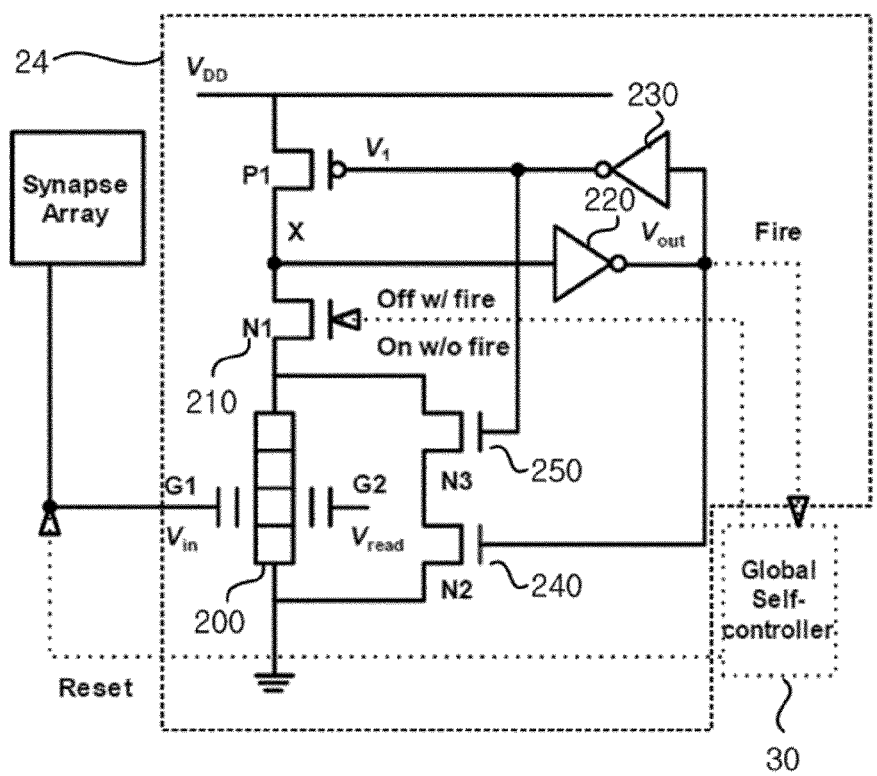
FIG. 4 is a circuit diagram illustrating a neuron circuit in a neuromorphic system according to a third embodiment of the invention.

FIG. 4 is a circuit diagram of a neuron circuit according to a third embodiment of the invention. Referring to FIG. 4, a neuron circuit 24 according to the third embodiment is similar to the neuron circuit according to the second embodiment except that a third switch N3 250 connected in series to the second switch N2 240 is further included.

The third switch N3 250 is preferably configured with an n-MOSFET. The source and the drain are connected to the sources of the fourth semiconductor region S4 and the second switch 240 of the neuromorphic device, respectively, and the gate is connected to the output terminal of the feedback circuit 230.

Hereinafter, operations of the neuron circuit according to the third embodiment will be described. When the current flows in the neuromorphic device to lower the potential of the node X, the potential of the output terminal is increased by the output circuit INV1, so that a current also flows in the second switch N2 to form a boosting path. As a result, the potential of the node X is more speedily lowered, and the firing occurs at a faster rate. The p-MOSFET P1 is turned on by the feedback circuit, and at the same time, the third switch N3 is turned off to instantaneously prevent current from flowing in the second switch N2. The first switch N1 is turned off by the signal output from the global self-controller, the potential of the node X is stably increased to the voltage VDD again, and the neuromorphic device is reset.

Figure 5:
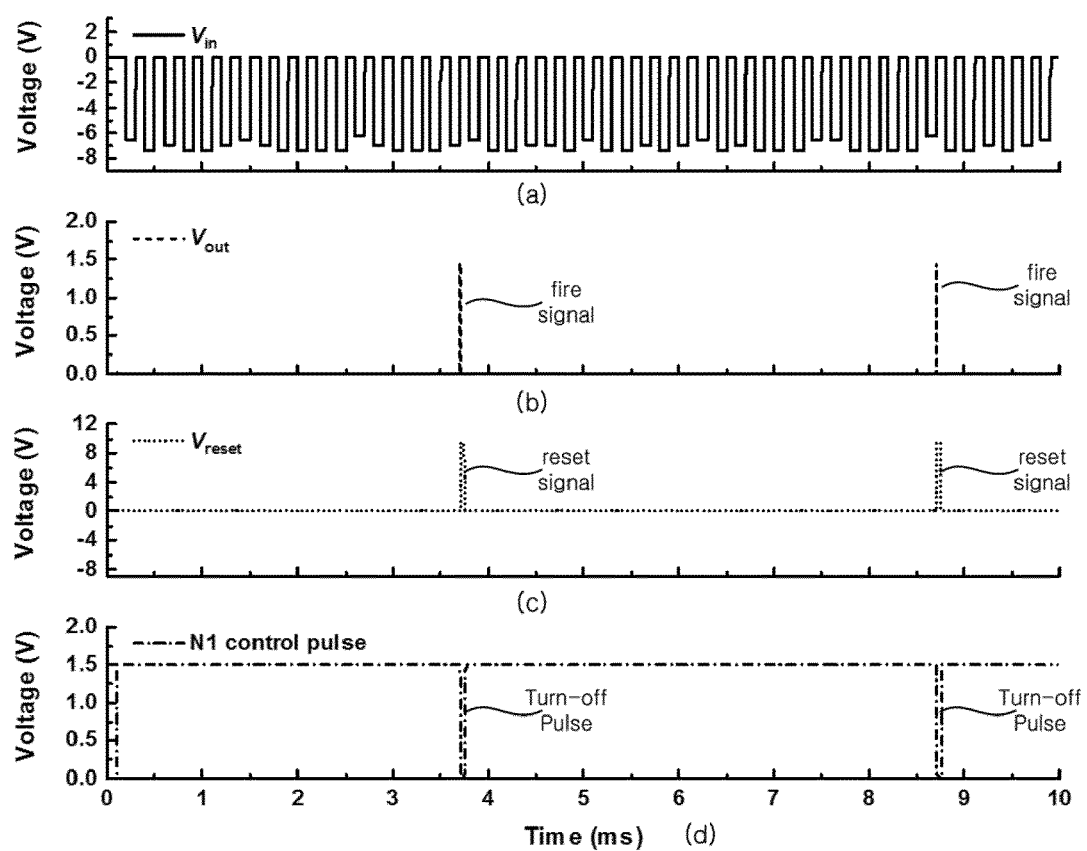
FIG. 5 is a graph illustrating operation characteristics of the neuron circuit in the neuromorphic system according to the first embodiment of the invention.

FIG. 5 is a graph of voltage versus time illustrating operation characteristics of the neuron circuit in the neuromorphic system according to the first embodiment of the invention.

Referring to FIG. 5, in the neuron circuit according to the invention, (a) illustrates a signal Vin input to the first gate electrode of the neuromorphic device as a signal pulse continuously output from the synapse array. (b) illustrates an output voltage Vout of the output circuit of the neuron circuit. When the signal pulse Vin from the synapse array is continuously input to the first gate electrode G1 of the neuromorphic device and the charges are accumulated and exceeds the predetermined threshold value, the voltage of the first gate electrode of the neuromorphic device is increased, and thus, the device operates as a positive feedback device, so that a current flows in the neuromorphic device and the potential of the node X is decreased. As a result, the voltage Vout of the output circuit is increased, and the firing occurs as illustrated in (b). (c) illustrates a reset signal Vreset supplied to the first gate electrode of the neuromorphic device in the global self-controller, and (d) illustrates a drive signal N1 (control pulse) supplied from the global self-controller to the first switching device. The firing signal output from the output circuit is supplied to the global self-controller, and the global self-controller having received the firing signal supplies the lateral inhibition signal to the fired neuromorphic device as illustrated in (c) and supplies the turn-off signal to the gate terminal of the switching device N1.

As described above, the neuron circuit according to the invention can implement the integrating function and the firing function of the neuron.

Figure 6:
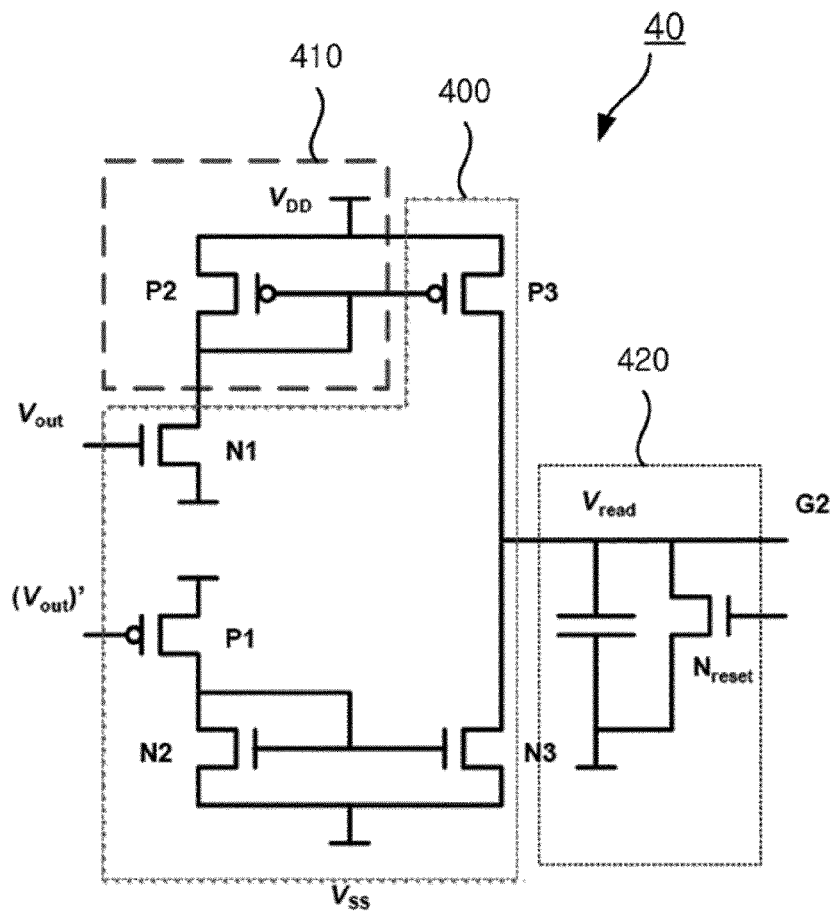
FIG. 6 is a circuit diagram illustrating a homeostatic circuit for implementing a homeostasis function of a neuron in a neuromorphic system according to the invention.

The neuromorphic system according to the invention preferably further includes a homeostatic circuit. FIG. 6 is a circuit diagram of a homeostatic circuit of the neuron for implementing a homeostasis function in the neuromorphic system according to the first embodiment described above.

Referring to FIG. 6, the homeostatic circuit 40 of the neuromorphic system according to the invention includes an individual current mirror 400, a common current mirror 410, and a charge storage device 420, which are configured with n-MOSFETs and p-MOSFETs.

The individual current mirror 400 is connected to the output terminal of the output circuit of the neuron circuit, and a second current I2 of the individual current mirror is input to the charge storage device 420. The charge storage device is connected to the second gate electrode G2 of the neuromorphic device of the neuron circuit, so that the voltage of the charge storage device is supplied as a voltage Vread to the second gate electrode of the neuromorphic device.

The common current mirror 410 is commonly connected to all the neuron circuits of the neuromorphic system, and a first current I1 of the common current mirror is input to the charge storage device 420.

The charge storage device 420 may be configured with a transistor or diode having a capacitor or a charge storage layer that can store charges or may be configured with a transistor or diode having a charge storage function.

The charge storage device accumulates charges generated by a difference between the second current I2 of the individual current mirror and the first current I1 of the common current mirror. Therefore, the neuromorphic device of the neuron circuit is fired and the firing signal is transmitted to the output terminal of the output circuit. The charges are accumulated in the charge storage device 420 through the individual current mirror 400. As a result, the threshold voltage of the fired neuromorphic device is adjusted by the charge storage device connected to the gate electrode G2. In a case where the neighboring neurons are fired by using the similar operation, the threshold voltage of the neighboring or all neuromorphic devices is adjusted to be lowered by the common current mirror, and thus, the firing rate of neurons is adjusted so that the homeostasis function can be implemented.

Figure 7:
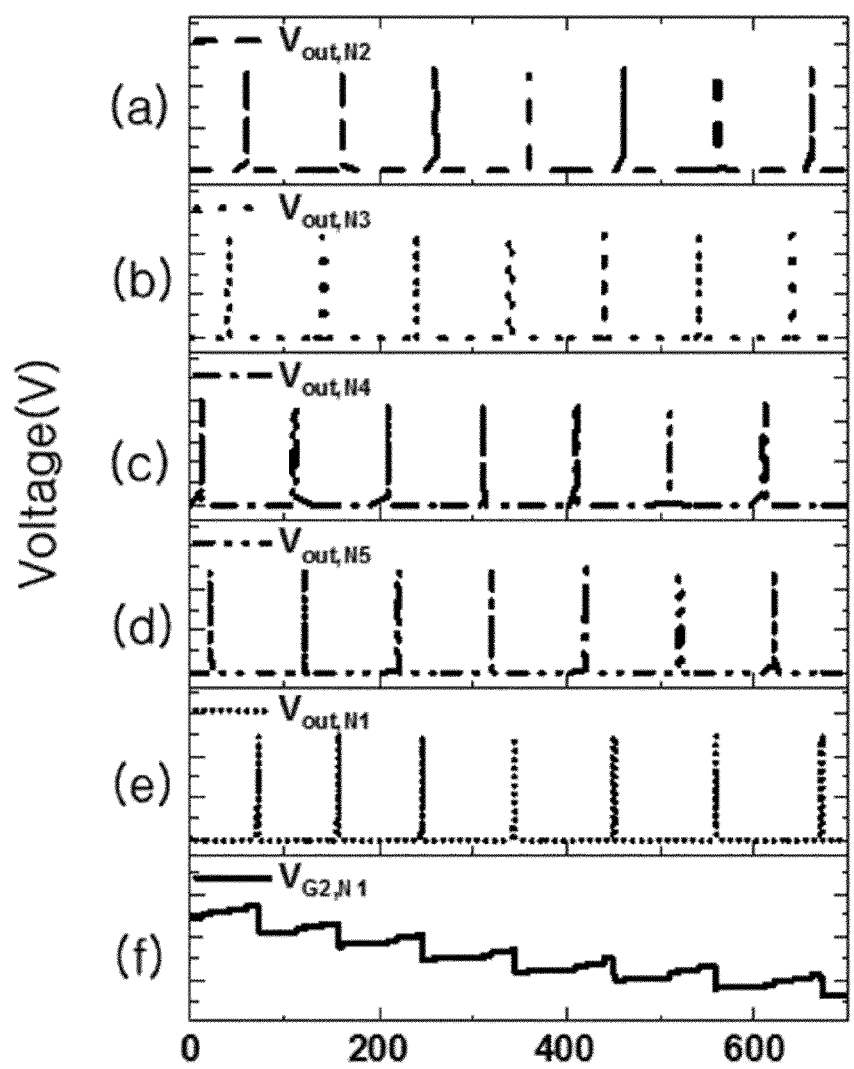
FIG. 7 is a graph illustrating operation characteristics for the homeostatic circuit of FIG. 6 in the neuromorphic system according to the invention.

FIG. 7 is a graph of the voltage versus time illustrating operation characteristics of the above-described homeostatic circuit in the neuromorphic system according to the invention.

Referring to FIG. 7, N1, N2, N3, N4, and N5 denote a first neuron circuit, a second neuron circuit, a third neuron circuit, a fourth neuron circuit, and a fifth neuron circuit; Vout denotes an output signal of the output circuit of the neuron circuit; and VG2 denotes a voltage applied to the second gate electrode of the neuromorphic device of the neuron circuit and becomes the voltage Vread supplied by the homeostatic circuit.

Vout, N1 denotes an output signal of the first neuron circuit; Vout, N2 denotes an output signal of the second neuron circuit; Vout, N3 denotes an output signal of the third neuron circuit; Vout, N4 denotes an output signal of the fourth neuron; Vout, N5 denotes an output signal of the fifth neuron circuit; and $V_{G2}$, N1 denotes a voltage applied by the homeostatic circuit to the second gate electrode of the neuromorphic device of the first neuron circuit. In FIG. 7, according to the firing signal of the first neuron circuit illustrated in (e), the homeostatic circuit supplies the voltage $V_{G2}$, N1 illustrated in (f) to the neuromorphic device of the first neuron circuit. The voltage $V_{G2}$, N1 is decreased by a large amount every time the first neuron circuit is fired, and the voltage $V_{G2}$, N1 is increased by a small amount every time another neighboring neuron circuit is fired, so that the threshold voltage of the second gate electrode of the neuromorphic device can be adjusted As illustrated in FIG. 7, the neuron circuit according to the invention adjusts the magnitude of the voltage applied to the second gate electrode of each neuromorphic device according to the firing rate of the neuron circuits existing in a monolayer by the homeostatic circuit, so that the function of adjusting the threshold voltage can be implemented.

Figure 8:
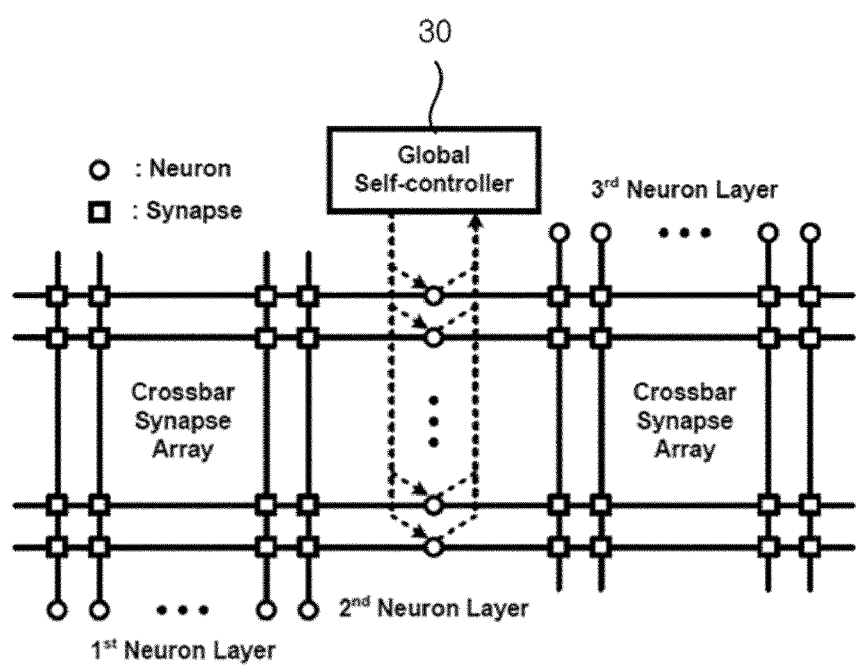
FIG. 8 is a diagram illustrating a structure in which a neuron circuit and an external crossbar synapse array are connected in the neuromorphic system according to the invention.

FIG. 8 is a diagram illustrating a structure in which a plurality of neuron circuits and an external crossbar synapse array are connected in the neuromorphic system according to the invention. The crossbar shape denotes a lattice structure for increasing the area efficiency of the external synapse array. These synapses are configured with independent devices having a memory function, and the neuron circuits are configured with a neuromorphic device and devices for operating the neuromorphic device. The synapse devices receive the necessary signals, and the neuromorphic devices are input with the sum of the currents as the outputs of the synapse devices.

The global self-controller 30 of FIG. 8 exists in order to organically operate each of the neuron circuits constituting a neuron monolayer. The global self-controller generates signals necessary for each of the neuron circuits in the system itself without an additional external controller. The neuron circuits of the neuron monolayer share the global self-controller, and the global self-controller generates various signals necessary for the neuron operation and selectively allocates the signals to each neuron circuit.

Figure 9:
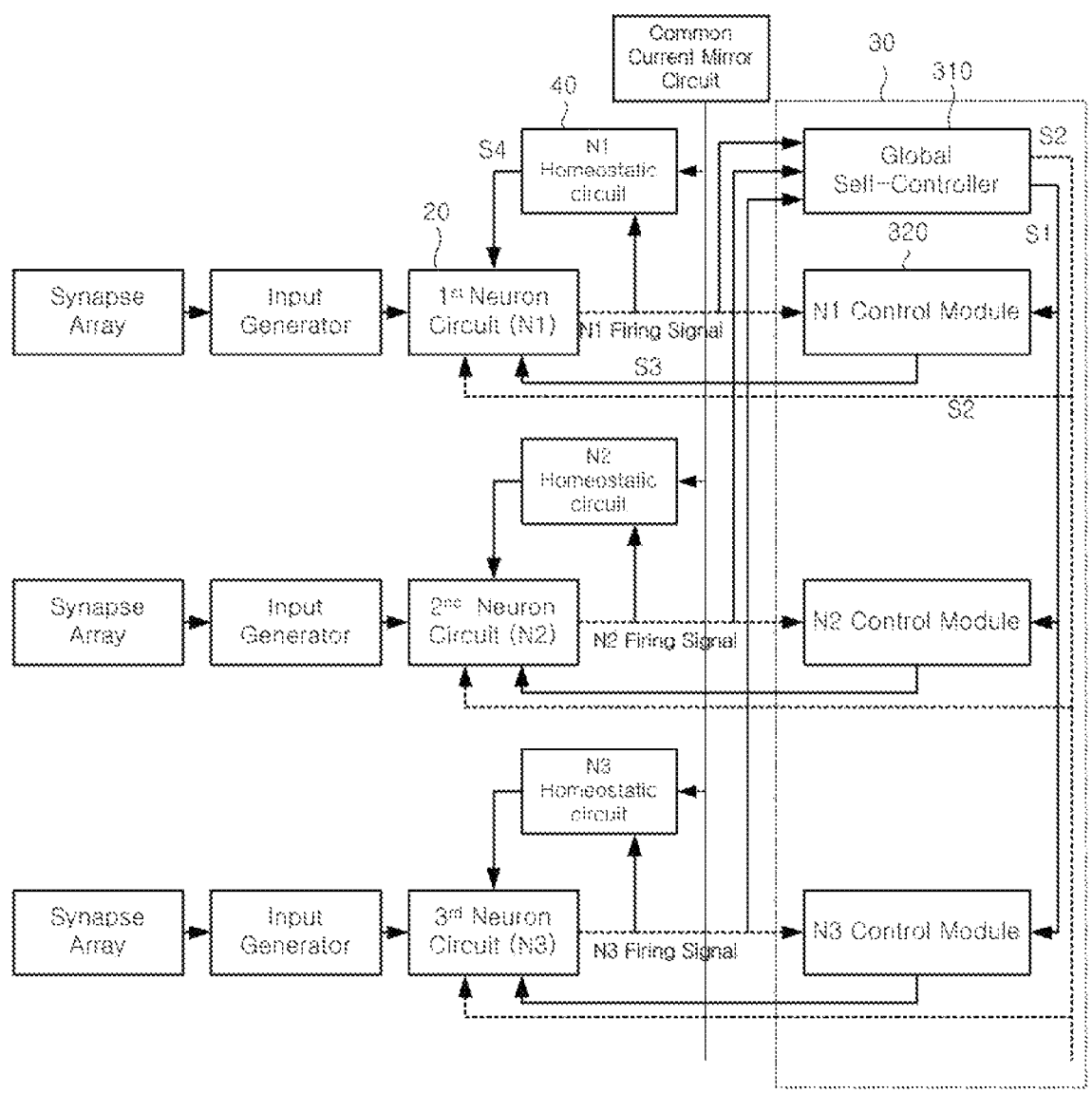
FIG. 9 is a block diagram illustrating a structure for a monolayer of a neuron circuit illustrating a flow of signals involved in organic operations of the circuits in the neuromorphic system according to the invention.

FIG. 9 is a conceptual diagram illustrating the flow of signals involved in organic operations of the neuron circuits 20, the homeostatic circuits 40, and the global self-controller 30 constitute the neuron monolayer illustrated in FIG. 8 in the neuromorphic system according to the embodiment of the invention. The global self-controller 30 generates various signals necessary for the operation of each neuron circuit by using the firing signal output as the firing function of the neuron circuit and controls the respective neuron circuit. In order to selectively supply various signals S1, S2, and S3 generated by the global self-controller to the respective neuron circuits, the switch controller corresponding to each neuron circuit adjusts the switch for a specific purpose.

Referring to FIG. 9, in the overall structure of the neuromorphic system including the global self-controller, as the number of neuron circuits constituting the neuron monolayer and the complexity of necessary signals increase, the systematic operation of the neuron circuits and the efficiency in the area are provided.

Figure 10:
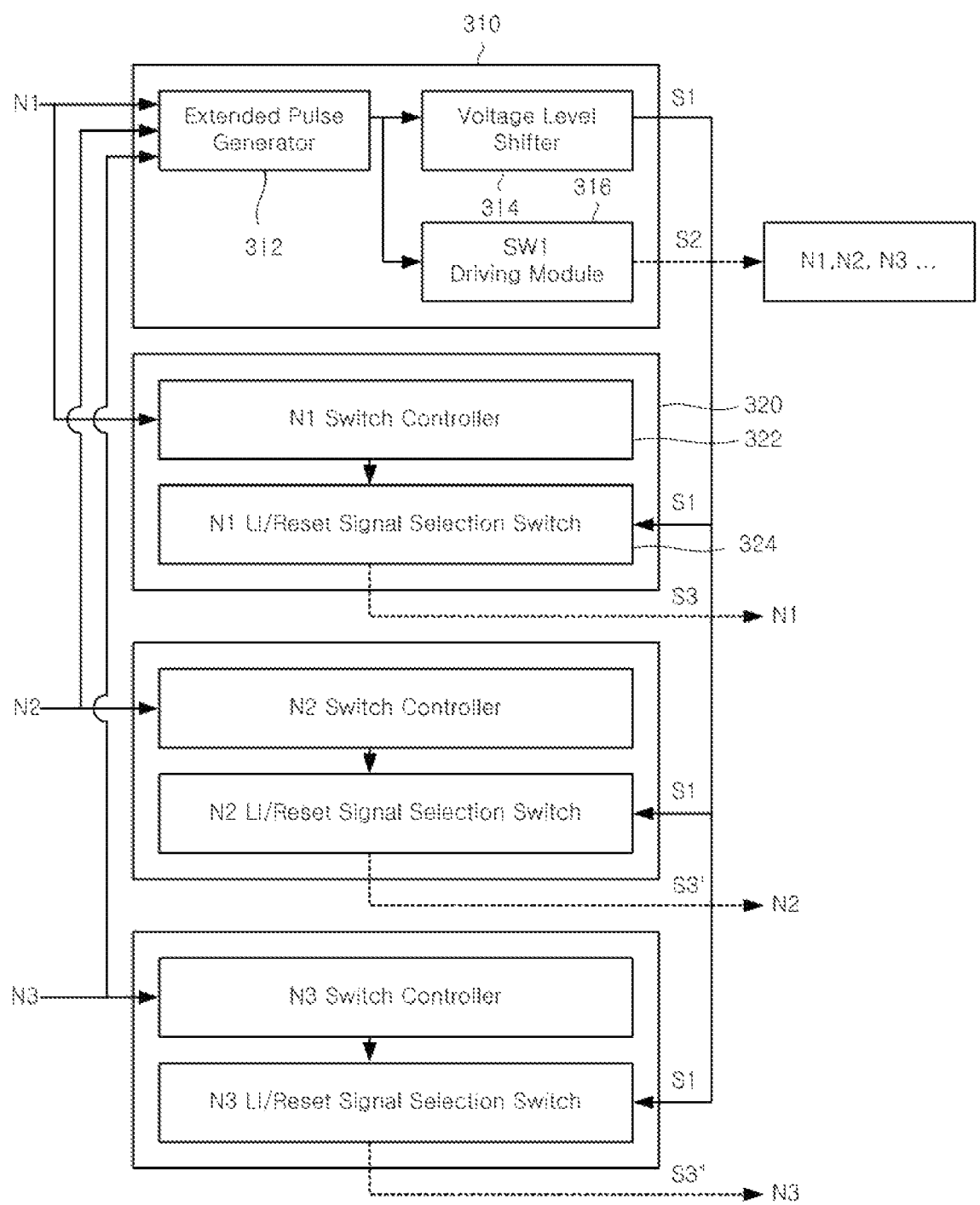
FIG. 10 is a block diagram illustrating a structure of a global self-controller shared by neuron circuits constituting a neuron monolayer in the neuromorphic system according to the invention.

FIG. 10 is a block diagram illustrating a structure of the global self-controller in the neuromorphic system according to the embodiment of the invention.

Referring to FIG. 10, the global self-controller 30 according to the invention includes a global self-control module 310 and an individual control module 320 corresponding to each neuron circuit. When the firing signal is input from the neuron circuits, the global self-control module 310 generates and supplies a reset pulse S1 having a predetermined pulse width and magnitude to the individual control modules of all the neuron circuits and generates a turn-off pulse S2 for turning off the first switches of the neuron circuits and supplies the pulse to the first switches of all the neuron circuits. By turning off the first switches of the neuron circuits, due to the firing of the neuron circuit, the neuromorphic device controls the current not to flow in the neuromorphic device during the time when the neuromorphic devices perform the reset operation or the lateral inhibition operation.

The individual control module 320 includes a switch controller 322 and an LI (Lateral Inhibition)/Reset signal selection switch 324.

The switch controller 322 corresponding to the neuron circuit having the firing function generates a predetermined selection signal for selecting the reset signal and supplies the selection signal to the LI/Reset signal selection switch 324. On the other hand, in the switch controller corresponding to the neuron circuit not having the firing function, the output is maintained in the existing state.

When the selection signal is input from the switch controller 322 of the neuron circuit having the firing function and the reset pulse S1 is input from the global self-control module 310, the selection switch 324 selects the lateral inhibition signal necessary for resetting the neuromorphic device and outputs the lateral inhibition signal to the neuron circuit.

On the other hand, in the switch controller included in the neuron not having the firing function, the switch 324 maintains the output in the existing state, and when the selection signal is not input, and the switch 324 selects the lateral inhibition signal necessary for the lateral inhibition operation and outputs the lateral inhibition signal to the neuron circuit.

As described above, according to the signal output from the individual control module, the neuron circuit having the firing function performs the reset operation, and the neuron circuit not having the firing function performs the lateral inhibition operation.

On the other hand, the types of the reset signal and the lateral inhibition signal necessary for the reset operation and the lateral inhibition operation can be designed differently according to the operation characteristics of the neuromorphic device. The global self-controller generates all signals by using the firing signal which is the output from the neuron circuit having the firing function in order to generate the guaranteed length and magnitude of the signal. Since the firing signal is a short spike signal, the global self-control module 310 of the global self-controller includes an extended pulse generator 312 and a voltage level shifter 314. The extended pulse generator 312 extends the pulse width of the firing signal and outputs the extended pulse, and the voltage level shifter 314 increases the pulse size of the firing signal and outputs the firing signal.

On the other hand, the global self-control module 310 further includes an SW1 driving module 316. When the firing signal is not input from the neuron circuits, the SW1 driving module 316 turns on the first switching devices. When the firing signal is input from an arbitrary neuron circuit, the SW1 driving module 316 generates a drive signal S2 for turning on the first switching device connected to the neuromorphic devices of all the neuron circuits and supplies the drive signal to the neuron circuits.

Figure 11:
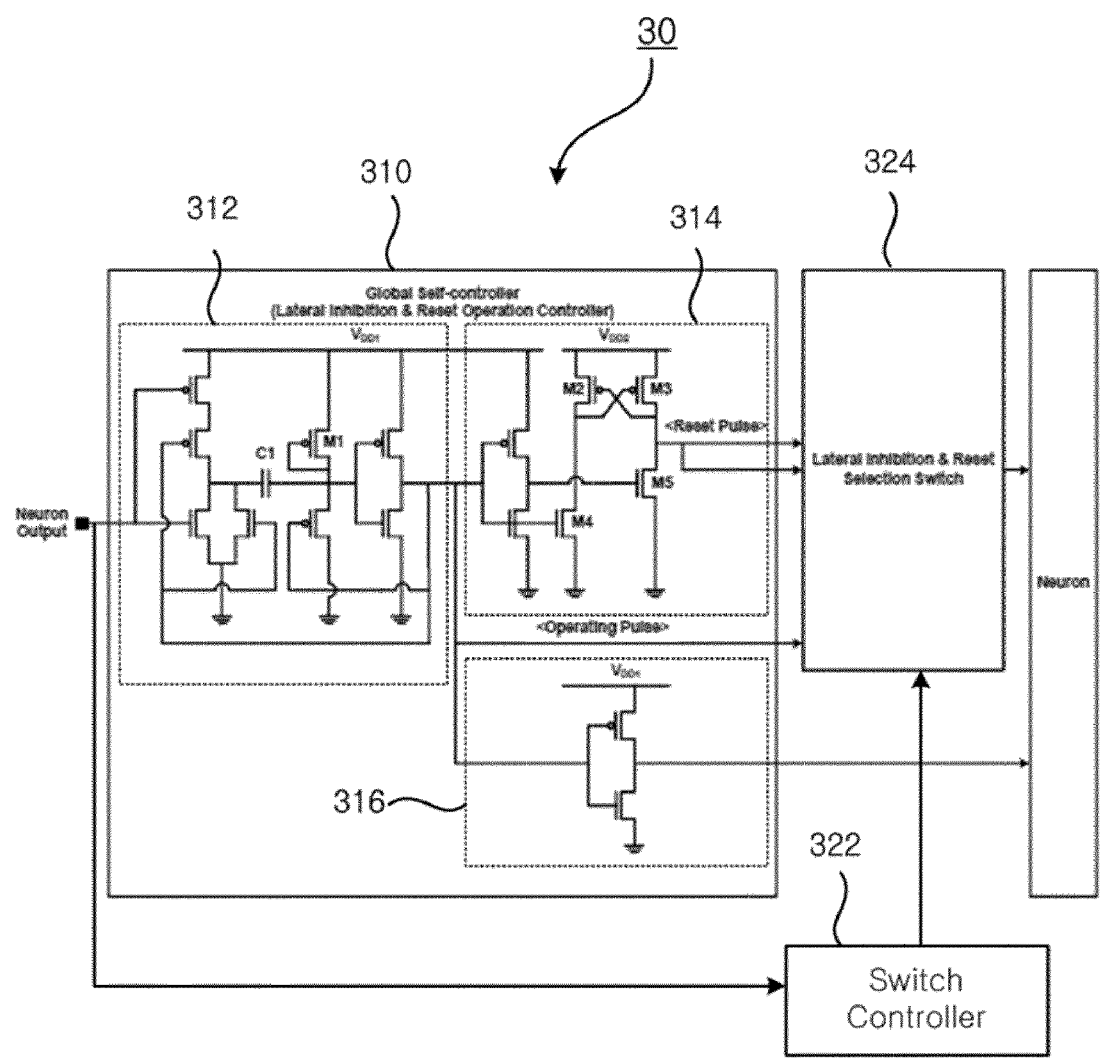
FIG. 11 is a circuit diagram illustrating a global self-controller including an extended pulse generator and a voltage level shifter in the neuromorphic system according to the invention.

FIG. 11 is a circuit diagram of the global self-control module 310 of the global self-controller according to the invention. The width of the pulse generated in the extended pulse generator 312 is determined by a ratio of width/length of the p-MOSFET M1 acting as a resistor and a capacitance value of the capacitor C1. The design considerations of the voltage level shifter 314 ensures that the ratio of width/length of the n-MOSFETs M2 and M3 is less than that of the p-MOSFETs M4 and M5. The design condition of such a voltage level shifter denotes that, in a case where the voltage level shifter is included in each neuron, the design condition of such a voltage level shifter causes a heavy burden on the system.

Figure 12:
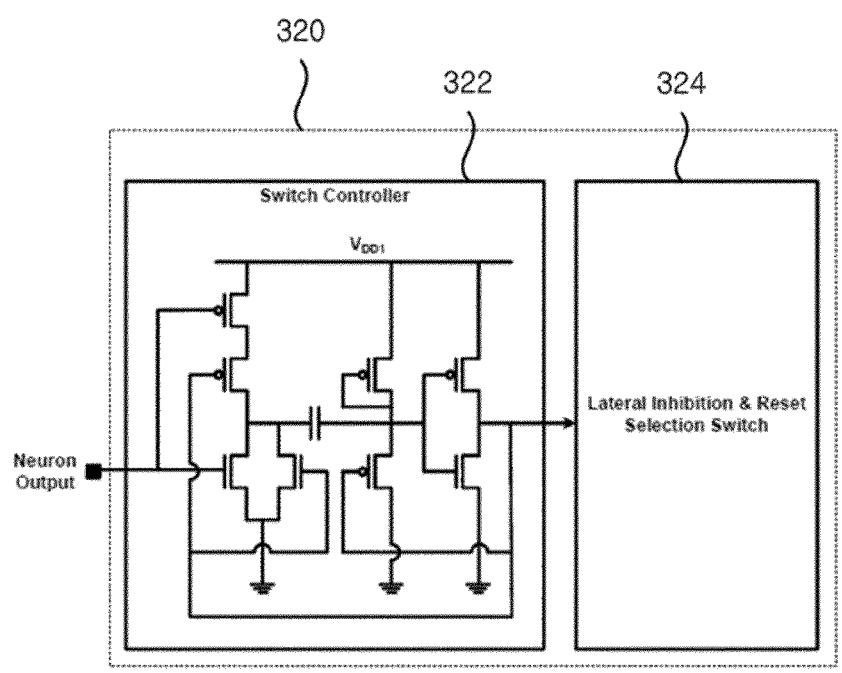
FIG. 12 is a circuit diagram of a switch controller necessary for a neuron circuit in order to selectively receive a signal in the neuromorphic system according to the invention.

FIG. 12 is a circuit diagram illustrating the switch controller of the global self-controller according to the invention. The switch controller 322 is the same as the extended pulse generator of the global self-control module.

Figure 13:
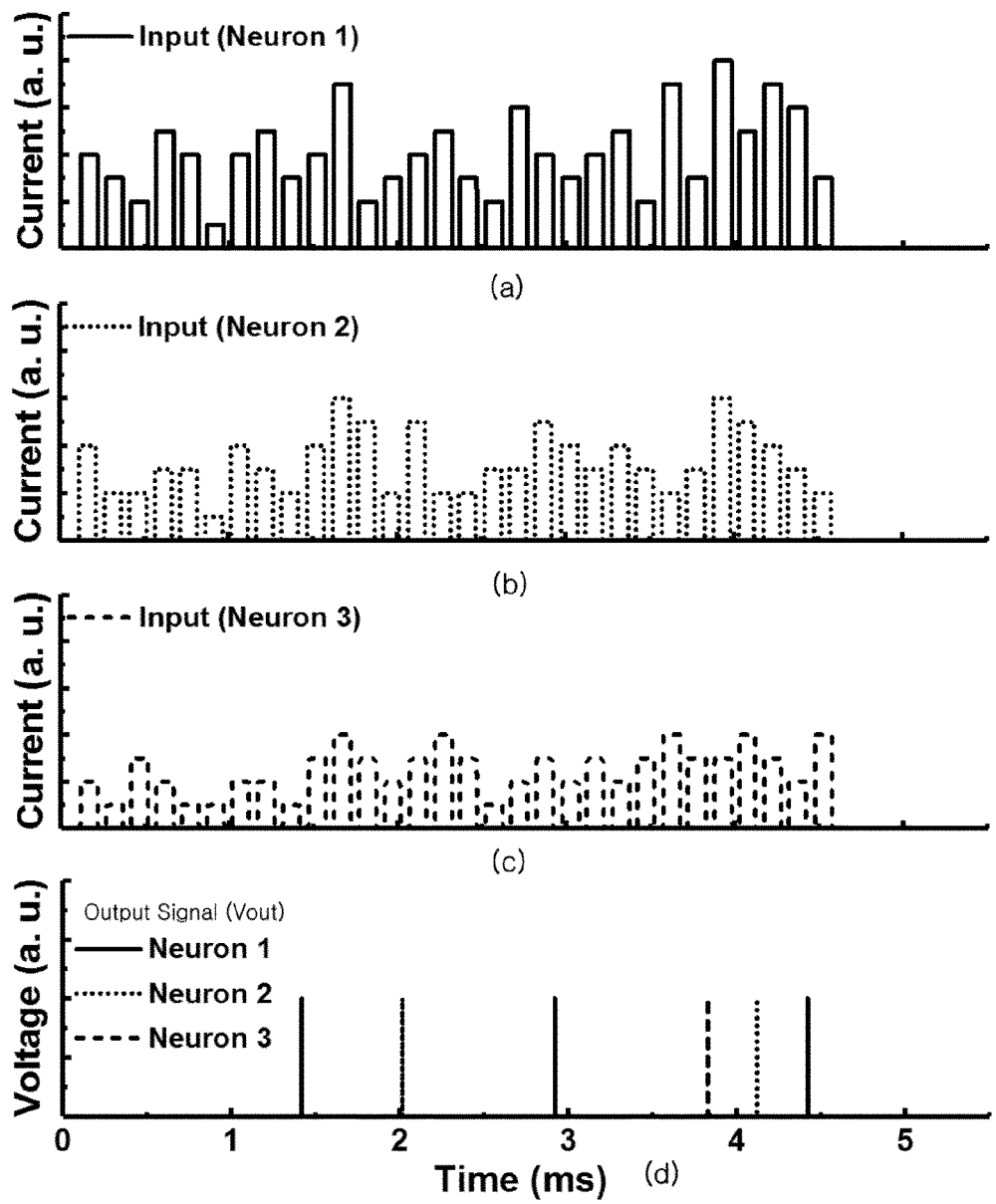
FIG. 13 is a graph illustrating time-dependent currents coming as input signals from external synapses to the neuron circuits and time-dependent output of the neuron circuits in the neuromorphic system according to the invention.
Figure 14:
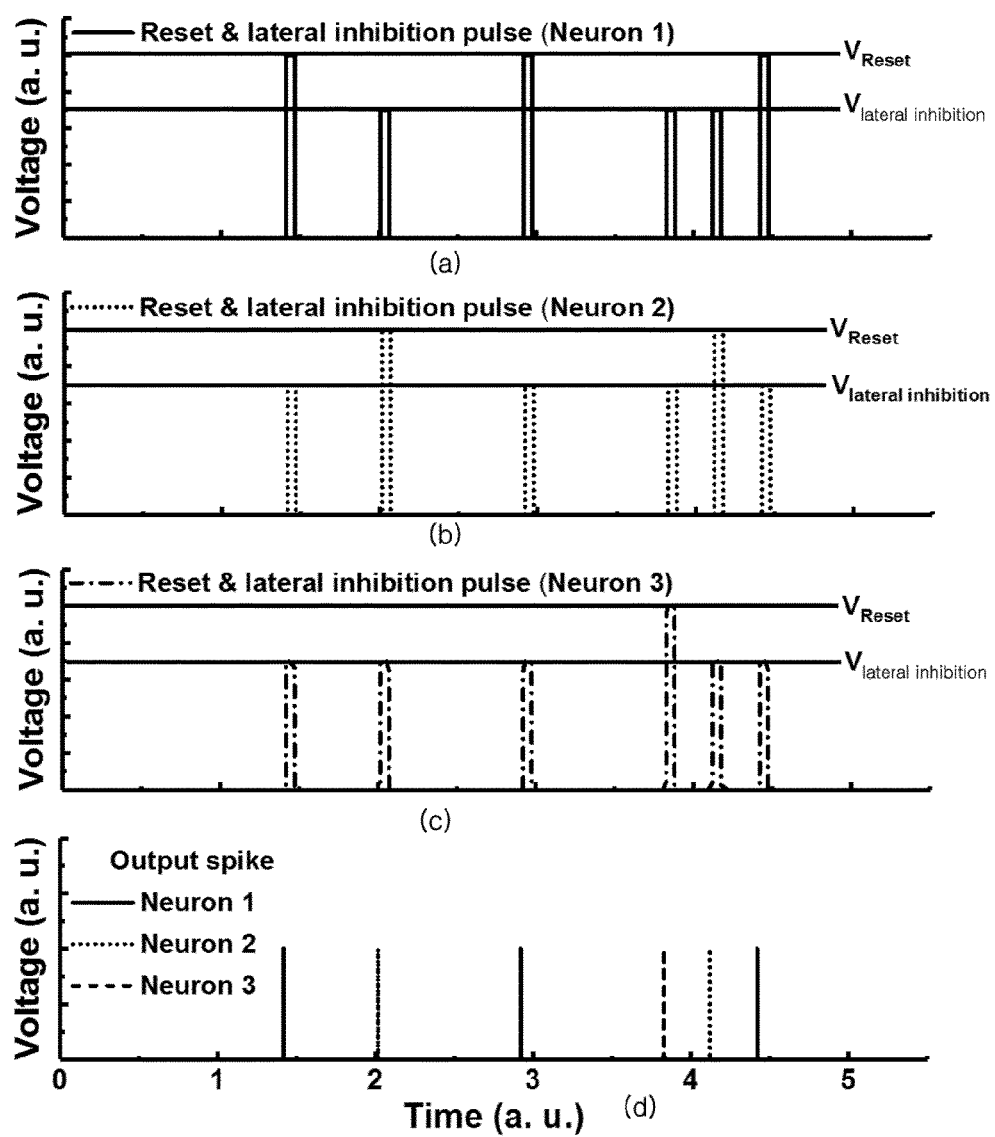
FIG. 14 is a graph illustrating time-dependent operation characteristics in which signals necessary for reset and lateral inhibition operations are selectively applied to each neuromorphic device according to an output of each neuron circuit in the neuromorphic system according to the invention.
Figure 15:
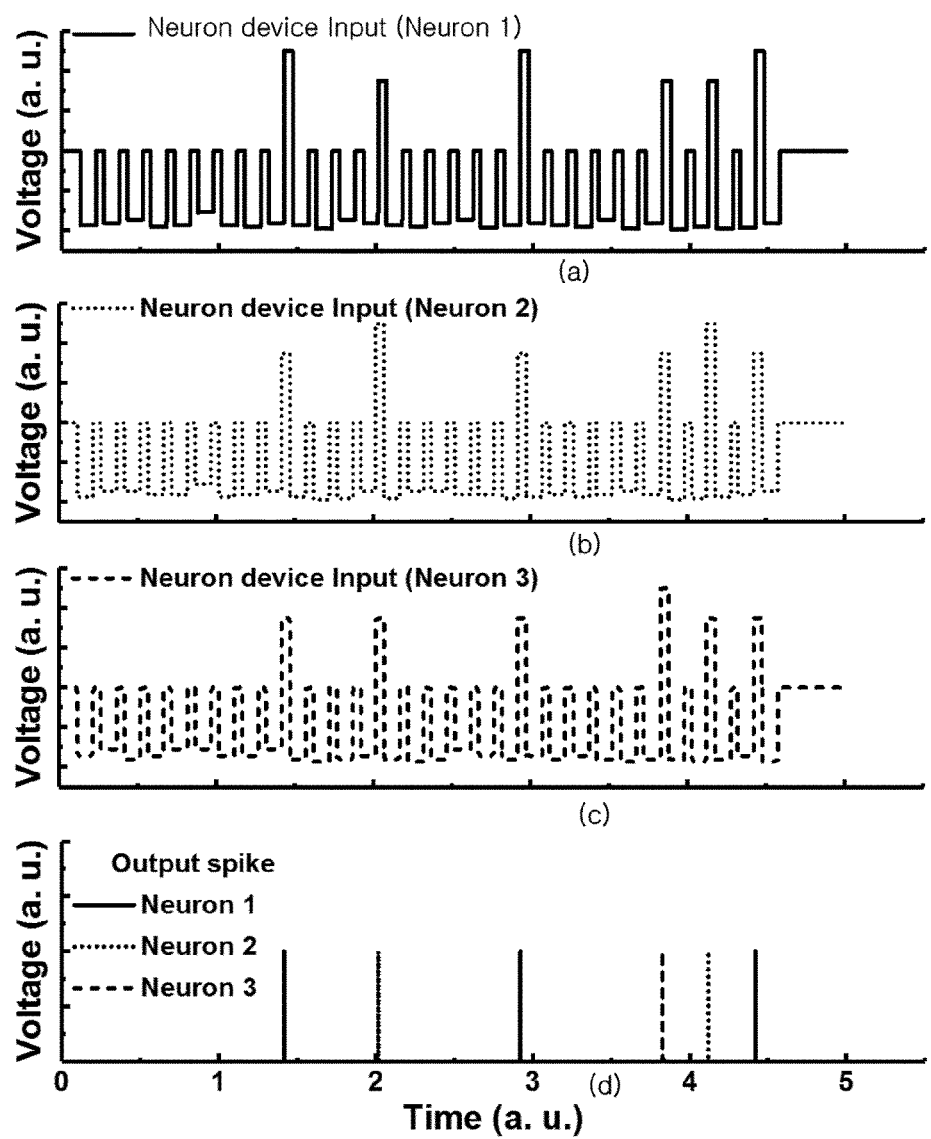
FIG. 15 is a graph illustrating a time-dependent input terminal voltage of the neuromorphic device according to an output of each neuron circuit in the neuromorphic system according to the invention.

FIGS. 13, 14, and 15 are graphs illustrating operation characteristics of the neuron circuit as of voltage and current according to time according to the embodiment of the invention.

(a), (b), and (c) of FIG. 13 illustrate time-dependent inflowing of the current from the external synapse into the neuron circuits Neuron 1, Neuron 2 and Neuron 3 as an input signal, and (d) of FIG. 13 illustrates a short spike shape as an output signal Vout of each neuron circuit when the neuromorphic device performs the firing function at a specific time.

(a), (b), and (c) of FIG. 14 are graphs illustrating time-dependent operations in which signals necessary for the reset and lateral inhibition operations are selectively applied to each neuron circuit when each neuron circuit (Neuron 1, Neuron 2, Neuron 3) exceeds the threshold value to perform the firing function. The signals illustrated in (a), (b), and (c) of FIG. 14 are the reset signal Vreset and the lateral inhibition signal Vlateral_inhibition applied to each of the neuron circuits according to the firing signal of each of the neuron circuits illustrated in (d) of FIG. 14. The signal coincides with the output signals of the switches included in each of the above-described neuron circuits.

FIG. 15 is a graph illustrating time-dependent input terminal voltage of the neuromorphic device that selectively receives the input signal from the external synapse and the signal from the global self-controller.

(a), (b), and (c) of FIG. 15 illustrate voltages at the first gate electrodes of the neuromorphic devices which are input terminals of the respective neuron circuits Neuron 1, Neuron 2, and Neuron 3 as the sum of the input signals applied from the external synapses and the reset signal or lateral inhibition signal applied from the global self-controller. Therefore, it can be seen that the voltage of the input terminal is increased every time each of the neuron circuits performs the firing function.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

A neuromorphic system according to the invention can increase a degree of integration due to a small occupying area, has a reliability based on a silicon technique, and can implement various functions to be implemented in neuromorphic technique, so that the neuromorphic system can be widely used in the fields of the neuromorphic technique.

What is claimed is:

1. A neuromorphic system comprising:
    one or two or more neuron circuits configured to output a firing signal according to signals input from a synapse array; and
    a global self-controller configured to generate and provide control signals for the neuron circuits by using the firing signal output from the neuron circuits,
    wherein the neuron circuit includes:
    a neuromorphic device configured to accumulate charges according to the signal input from the synapse array and to allow a current to suddenly flow when a potential due to the accumulated charges reaches a threshold value;
    an output circuit connected to one end of the neuromorphic device and outputting the firing signal according to an output signal of the neuromorphic device; and
    a first switching device configured to be located between one end of the neuromorphic device and the output circuit and to control an electrical connection between the neuromorphic device and the output circuit,
    one or more homeostatic circuits provided corresponding to the respective neuron circuits,
    wherein an input terminal of the one or more homeostatic circuits is connected to an output terminal of the output circuit of the neuron circuit, and an output terminal of the one or more homeostatic circuits is connected to a second gate electrode of the neuromorphic device, and wherein the one or more homeostatic circuits control a voltage applied to the second gate electrode of the neuromorphic device according to a signal of the output terminal of the output circuit to adjust a firing threshold voltage of the neuromorphic device and adjust a firing rate of the neuron circuit so as to be capable of implementing a homeostasis function of neurons.

2. The neuromorphic system according to claim 1, wherein the neuromorphic device includes:

a first semiconductor region provided on a substrate, the first semiconductor region having a horizontally or vertically thin flat structure;

first, second, third, and fourth doped regions provided in the first semiconductor region;

a first insulating film configured so that at least the second and third doped regions among the doped regions are separated from the substrate by a predetermined distance;

a first gate electrode located on one side of the second or third doped region, the first gate electrode being electrically insulated from the second and third doped regions; and a first gate insulating film stack provided at least between one side of the second or third doped region and the first gate electrode, and wherein the neuron circuit outputs the firing signal to the global self-controller according to the signal input from the synapse array to the first gate electrode of the neuromorphic device.

3. The neuromorphic system according to claim 2, wherein the first gate electrode of the neuromorphic device is connected to the synapse array through a current mirror circuit, and wherein the neuromorphic device implements an integrating function of the neuron by storing or removing charges in or from the first gate insulating film stack according to the signal applied from the synapse array.

4. The neuromorphic system according to claim 1, wherein, when the firing signal is input from one neuron circuit, the global self-controller generates and supplies a reset signal for the neuromorphic device of the fired neuron circuit, and the global self-controller generates and supplies a lateral inhibition signal for the neuromorphic device of the non-fired neuron circuit.

5. The neuromorphic system according to claim 1, wherein, when the firing signal is input from one neuron circuit, the global self-controller generates a turn-off signal for the first switching devices included in the neuron circuits and supplies the turn-off signal to the neuron circuits so that the first switching devices are turned off and no current flows in the neuromorphic device.

6. The neuromorphic system according to claim 1, wherein the neuron circuit further includes:

a second switching device configured to be connected in parallel to the neuromorphic device and to be driven by an output signal of the output circuit; and a feedback circuit connected to the output circuit, and wherein the second switching device is configured to be turned on by the firing signal output from the output circuit and to improve the firing function of the neuron circuit.

7. The neuromorphic system according to claim 1, wherein the one or more homeostatic circuits include:

an individual current mirror circuit connected to the output terminal of the neuron circuit;

a common current mirror circuit commonly connected to all the neuron circuits connected to the global self-controller; and a charge storage device as a device capable of storing charges configured to accumulate the charges by currents flowing in the individual current mirror circuit and the common current mirror circuit and to be connected to the second gate electrode of the neuromorphic device of the neuron circuit.

8. The neuromorphic system according to claim 7, wherein when the neuron circuit is fired, the one or more homeostatic circuits allow the firing signal to be transmitted to the individual current mirror and accumulates the charges in the charge storage device connected to the fired neuron circuit so as to increase a threshold voltage of the fired neuron circuit, and the one or more homeostatic circuits allow the firing signal to be transmitted to the common current mirror and discharges the charges accumulated in the charge storage device connected to the non-fired neuron circuit so as to decrease the threshold voltage of the non-fired neuron circuit.

9. The neuromorphic system according to claim 1, wherein the global self-controller includes:

a global self-control module that generates a reset pulse when the firing signal is input from one of the one or two or more neuron circuits and outputs the reset pulse; and one or two or more individual control modules that generate signals for controlling the respective neuron circuits according to the reset pulse and the firing signal input from the neuron circuits and output the signals to corresponding neuron circuits, and wherein the global self-controller generates control signals for the neuron circuits by using the firing signals input from the neuron circuits and supplies the control signals to the neuron circuits.

10. The neuromorphic system according to claim 9, wherein the global self-control module includes:

an extended pulse generator that extends a pulse width of the input firing signal and outputs the firing signal;

a voltage level shifter that generates the reset pulse by increasing a size of the firing signal having the extended pulse width and outputs the reset pulse to the individual control modules; and an SW1 driving module that generates a turn-off signal for the first switching device by using the firing signal having the extended pulse width and outputs the turn-off signal to each neuron circuit.

11. The neuromorphic system according to claim 9, wherein the global self-control module includes:

a switch controller that generates a predetermined selection signal necessary for selecting the reset signal and outputs the selection signal when the firing signal is input from the neuron circuit; and an LI/Reset signal selection switch that selects one of the reset signal and a lateral inhibition signal according to signals input from the switch controller and the global self-control module and outputs the selected signal to the neuromorphic device of the neuron circuit.

12. The neuromorphic system according to claim 11, wherein the LI/Reset signal selection switch selects and outputs the reset signal when the selection signal is input from the switch controller and the reset pulse is input from the global self-control module, and the LI/Reset signal selection switch selects and outputs the lateral inhibition signal when no selection signal is input from the switch controller.

13. The neuromorphic system according to claim 1, wherein the output circuit is configured with one of:
   an inverter that inverts and outputs an input signal, and
   a current-voltage converter that converts an input current into a voltage and outputs the voltage.

* * * * *